Jan. 3, 1961  R. H. DEITRICKSON  2,966,893
CONTROL VALVES FOR FLUID ACTUATED PUMPS
Filed Jan. 26, 1959  3 Sheets-Sheet 1

INVENTOR
Roy H. Deitrickson
BY
Owen & Owen
ATTORNEYS

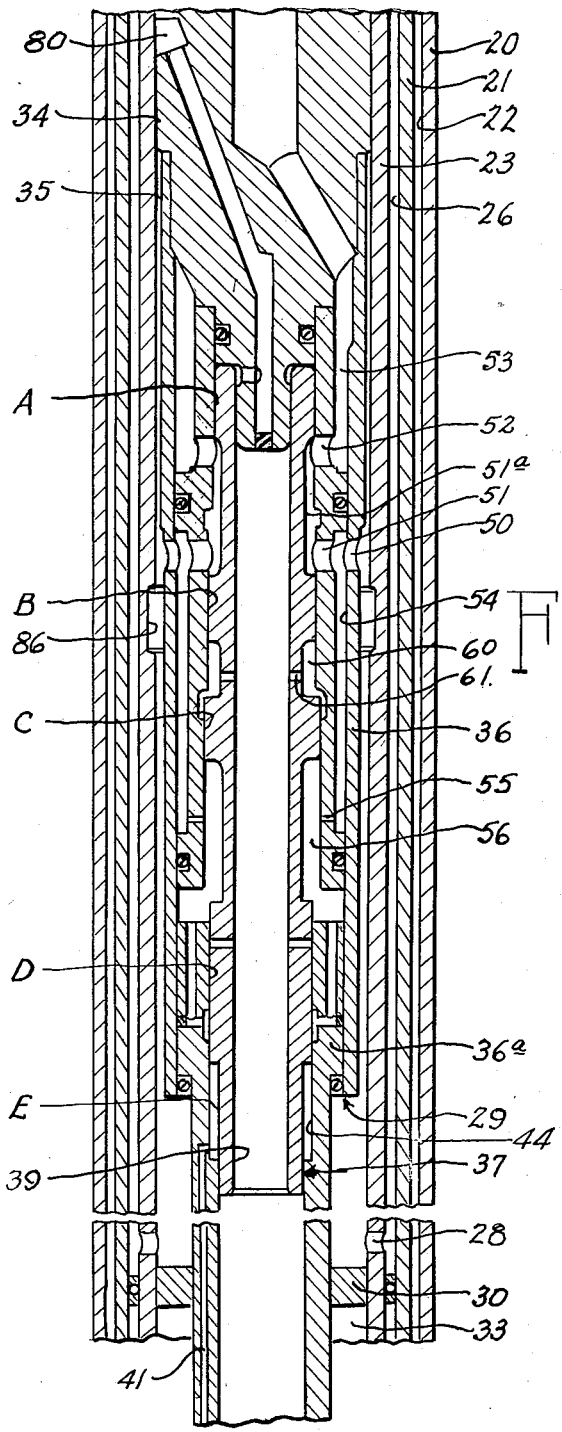

INVENTOR
Roy H. Deitrickson
Owens Owen
ATTORNEYS

United States Patent Office 2,966,893
Patented Jan. 3, 1961

2,966,893

CONTROL VALVES FOR FLUID ACTUATED PUMPS

Roy H. Deitrickson, Allison Park, Pa., assignor to The National Supply Company, Pittsburgh, Pa., a corporation of Ohio Filed Jan. 26, 1959, Ser. No. 788,981

2 Claims. (Cl. 121—123)

This invention relates to control vales for fluid operated downwell pumps and is particularly directed to a construction in which the control valve for directing fluid to the space above the engine piston, and for discharging fluid from such space, is carried within the piston.

The control valve of the present invention is utilized in a fluid actuated engine of the type having differential area upper and lower faces so that if the smaller face of the engine piston is exposed to high pressure fluid at all times and the other and larger face of the piston is alternately exposed to high pressure and low pressure fluid reversal of movement of the piston will occur.

The primary object of the invention is to provide a control valve for a fluid operated engine for a downwell pump in which a high reversing force for the valve is available at each end of the stroke of the engine piston for positive reversal of the valve.

Another object of the invention is to provide a control valve for a fluid operated engine for a downwell pump in which the body of the valve is essentially balanced in each of two operating positions, and is formed with differential areas, which areas act to hold the valve in its operating position prior to the application of a positive reversal force.

Other objects and advantages of the invention will become apparent from the following specification, reference being had to the accompanying drawings, in which:

Fig. 2 is a fragmentary longitudinal cross-sectional view showing the valve parts in the position occupied during the down stroke;

Figure 1:
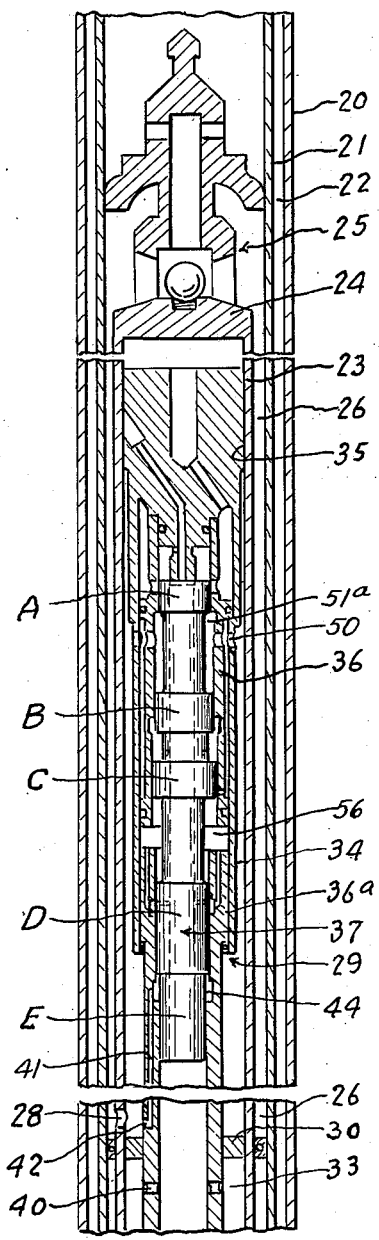
Figure 1 is a fragmentary longitudinal cross-sectional view of a hydraulic engine comprising a reversing valve constructed according to the present invention, with the valve in the position occupied during the top reversal, the valve body itself being shown in full lines.

The invention consists of a pressure actuated valve carried within the piston of a fluid operated engine, and reversing its position at the top and bottom of the stroke of the piston in response to a change in pressure on one or more control surfaces formed on the valve. Thus the valve undergoes a powered reversal at each end of the stroke of the engine piston. When in one position, the valve serves to connect the engine cylnider above the piston with a source of high pressure operating fluid, while in its second position the valve serves to connect this same cylinder space with a lower, or discharge pressure.

In accordance with the invention, the valve body is formed with a series of steps or annular areas on which different hydraulic pressures are imposed which tend to hold the valve in its attained position during both the upstroke and down stroke of the engine piston. Thus the valve is stable and will not shift inadvertently prior to the completion of that portion of the cycle for which it has made the proper hydraulic connections. At the end of each stroke of the piston, certain annular areas of the valve are subjected to rapid increase in pressure by reason of the registration of certain ports moving with the piston with a source of high pressure operating fluid. The hydraulic force drived from the high pressure fluid is well in excess of that required to overcome the small holding force on the valve and to shift it to its opposite or reversed position.

As used in the following specification and in the claims, the term "hydraulic force" covers the summation of hydraulic forces acting at any given time in any one direction. The hydraulic force can be created in either of two ways: first, by exposing equal areas to different and oppositely acting pressures; or secondly, by exposing different and opposed areas to the same pressure. It should also be noted that, as used in the following specification, the terms "up" and "down" and other forms thereof such as "upwardly," "downwardly," "upstroke" and "down stroke" relate to the orientation of the embodiments described and are not limitations either upon the position of the parts in other embodiments of the invention or to be interpreted as limiting the invention to such positions or directions.

*Engine construction*

A control valve embodying the invention is intended to be employed with a flutd actuated engine for a downwell pump of the general type that is located at or near the bottom of a well casing fragmentarily indicated in the figures by the reference numeral 20. The casing 20 contains tubing 21 in the usual manner and an annulus 22 between these two conduits may be used for any desired purpose. In illustrating the engine of the downwell pump it will be assumed that the pump itself is of the type well known in the art which discharges its production fluid, that is the crude oil drawn from the formation, either into the annulus 22 above described, or into a separate pipe or conduit especially adapted for the purpose.

The engine for a downwell pump of this general type has an engine cylinder 23 which carries at its top a fitting 24, including a valve assembly 25 by which power fluid may be taken from the tubing 21 if the pump is of the free type. This arrangement is well known in the art and the power fluid is supplied from the surface by surface equipment that is also well known. The engine cylinder 23 is spaced from the interior of the tubing 21 below the valve assembly 25 to provide a power fluid annulus 26 which is filled at all times with power oil supplied from the surface through the fitting 24 and the valve 25. The annulus 26 is connected through ports 28 at the lower end of the engine cylinder to the interior of the cylinder beneath the engine piston which is designated generally 29.

Below the engine cylinder is a stuffing box 30 through which the pump piston rod extends to connect the engine and pump pistons in the usual manner. The pump piston is not shown in the drawings. The stuffing box 30 separates the engine cylinder, which thus contains high pressure oil at its lower side, from a space 33 which represents the power oil discharge space and thus contains low pressure oil.

Within the engine cylinder 23 the engine piston 29 is operated by means of the power fluid supplied from the surface to annulus 26. The piston comprises a close fitting section 34 and a portion of smaller diameter therebelow which is designated 35 in the drawings and which contains the valve parts hereafter described.

Within the piston a valve jacket 36, 36a is provided which is formed to cooperate with a spool-type valve, the body of which is designated 37. The jacket itself is preferably made of upper and lower parts for ease of assembly and each part is drilled with the various supply and exhaust passages hereafter described.

The spool valve 37 is a hollow cylindrical member guided by its various lands for reciprocation within the jacket 36, 36a. During the down stroke, the valve stands in an upper position, and during the upstroke of the piston 29 the valve stands in a lower position. The periphery of the valve is stepped to provide close fitting lands, A, B, C, D and E which serve to separate fluids at various pressures from each other and serve to provide differential area shoulders against which pressures can act to move the valve from one position to the other. A differential area shoulder occurs between lands of the valve and represents a step in its diameter. Thus, a chamber formed by such lands or shoulders may have, for example, an area greater by .040 square inch on one side than on the other. If such a chamber is filled with oil at say 2000 p.s.i., a force of 80 pounds will be set up tending to move the valve in the direction of the larger area land or shoulder.

The engine piston 29 is, as above stated, connected to a pump piston (not shown) by piston rod 32 which is hollow and thus provides a central discharge passage 39. The passage 39 connects to a main discharge port 40 which is at all times below the stuffing box 30 and is diagrammatically indicated in Fig. 1.

The piston rod 32 is provided with an additional separate longitudinal passage 41 which terminates in a lateral rod port 42 and which, at its upper end, communicates with an annular space 44 between lands D and E on the valve body. Since land E is made smaller in diameter than land D, the pressure of a fluid introduced into chamber 44 will tend to move the valve body upwardly. Such action will be described in connection with the "top reversal" of the valve hereinafter. As will also be more fully described hereinafter, the lateral rod port 42 moves temporarily above the stuffing box 30 at the end of the upward stroke of the engine piston with the result that the pressure conditions in passage 41 and chamber 44 change abruptly at this point in the stroke.

Down stroke

Figure 2 of the drawings shows the valve in the position occupied while the piston is making a down stroke. In this position fluid is being supplied from the power fluid annulus 26 to the lower end of the engine cylinder, up around the smaller diameter piston portion 35, through a main supply port 50 in the side wall of the piston, through a port 51 in the valve jacket 36 to a reduced portion 51a of the valve spool between lands A and B, through a radial port 52 in the valve jacket 36 to an upwardly extending passage 53 which communicates with the cylinder space above the engine piston. Since the top of the engine piston has a greater effective area than the lower side thereof, due to the presence of the piston rod, the piston will move downwardly if the pressure times the area on the upper face is greater than the pressure times the area on the lower face.

Power oil from the main supply port 50 also enters a longitudinal passage 54 in the jacket 36 and is fed by a small radial passage 55 to a chamber 56 formed between lands C and D on the valve body to create a balancing force tending to hold the valve in its upper position which it must occupy during the down stroke.

The effective areas of the several lands are as follows:

| Chamber | Area | Direction of Force |
| --- | --- | --- |
| Between land A and B | .020 | Acting down. |
| Between land C and D | .040 | Acting up. |
| Between land D and E | .040 | Acting down. |

It will thus be seen that land A is smaller in diameter than land B, land B is smaller in diameter than land C, land D is also smaller in diameter than land C, and land E is smaller in diameter than land D.

A chamber 60 between lands B and C of the valve body is maintained constantly at discharge pressure by reason of its communication through a radial port 61 with the central discharge passage 39 in the valve body 37. Since passage 41 also contains fluid at discharge pressure, chamber 44 is likewise at the same pressure during the down stroke. The principal forces acting on the valve in the down stroke direction, therefore, comprise an upward force derived from chamber 56 equal to .040 times the discharge pressure in pounds per square inch which is opposed to a smaller force derived from the lower side of chamber 51a which is equal to .020 times the power oil pressure. The valve is thus held in its upper position by this difference in forces but is otherwise balanced.

The down stroke of the piston continues until the bottom reversal takes place.

Bottom reversal

To cause the bottom reversal of the engine piston 29, the upper piston portion 34 which fits closely against the cylinder wall is provided with a side port 80 which is normally closed by engagement with the wall of the cylinder. This port opens into a passage 82 which extends centrally of the piston to a space 84 over the top of the valve body 37.

Near its lower end, the wall of the cylinder 23 is formed with a groove 86 in its wall which is constantly filled with power oil at high pressure from the lower portion or end of the cylinder. When the piston side port 80 registers with the groove 86, oil at full power oil pressure enters the space 84 above the valve body 37 forcing it downwardly to open the port 52 to discharge through the interior of the valve body 37 to the discharge passage 39. The force on the top of the valve is opposed principally by the discharge pressure acting on the lower face of the valve, so that a large unbalanced force is available to move the valve downwardly. This movement continues until the valve clears the body of a stationary element 72 around which the valve body stands during the down stroke.

Figures 3, 4:
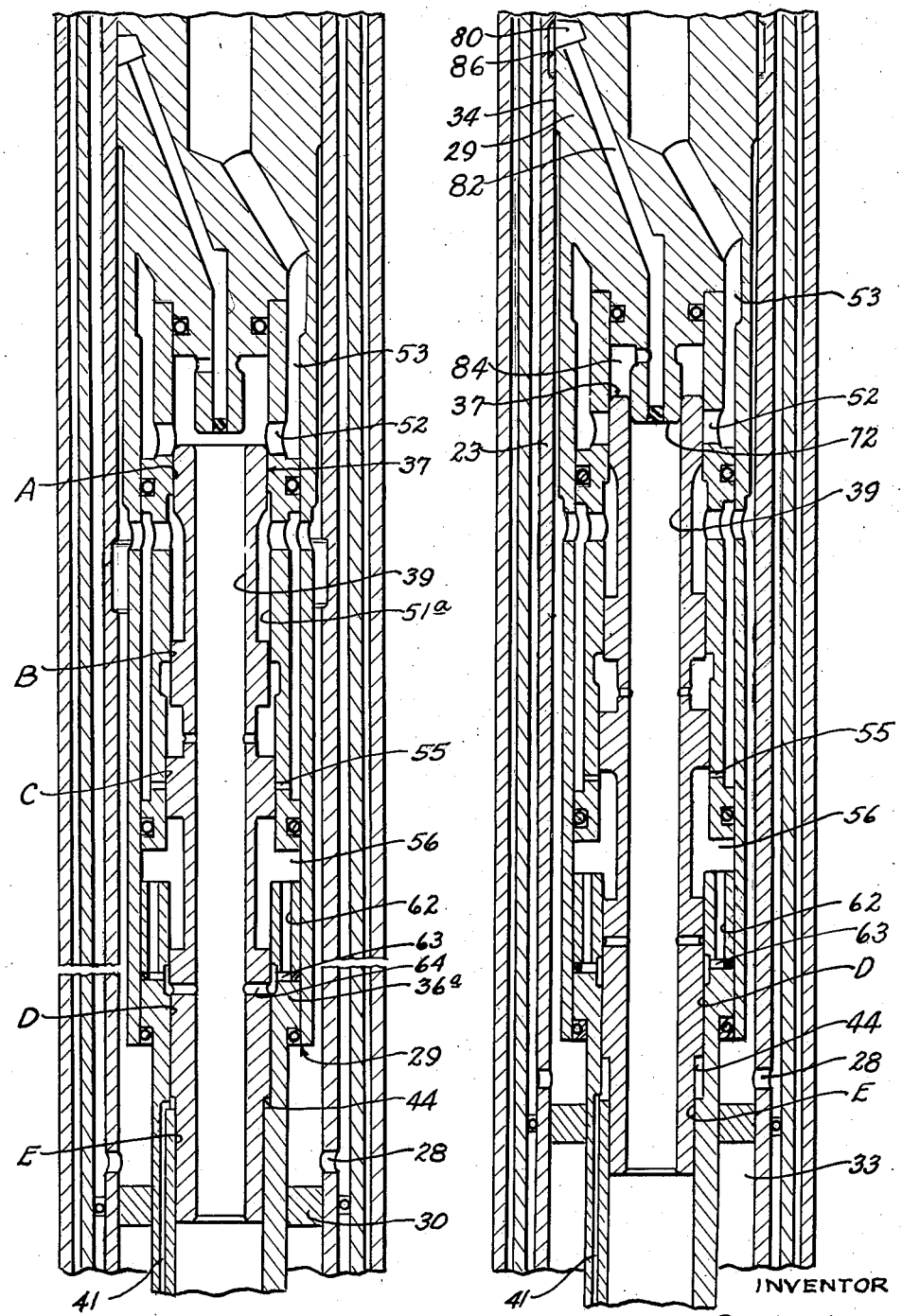
Fig. 3 is a view similar to Fig. 2 with the vale in the position of bottom reversal.
Fig. 4 is a view similar to Fig. 2 with the valve in the upstroke position.

With the valve body forced downwardly, the upper cylinder port 52 is opened to exhaust and the upstroke of the engine piston begins. The valve body is again essentially balanced, but there is a slight force balancing the valve to stand in its lowered position. This bottom reversal position is shown in Fig. 3 of the drawings, the valve being shown in an intermediate position on its way between the closing of port 52 to the source of power oil and the opening of this port to discharge through the hollow interior of the valve. This bottom reversal, as above noted, continues until the valve has reached its lowermost position and is ready for an upstroke.

Upstroke

The position of the valve and its associated parts during the upstroke is shown in Fig. 4. The upstroke of the engine piston is caused by the pressure on the lower face of the piston predominating over the pressure on the upper face, the cylinder space above the piston being connected to exhaust through passage 53 and port 52, into the hollow interior of the valve body and down through the rod to the main discharge port 40 below the stuffing box 30. Thereafter, the spent power oil may either be mingled with the production fluid from the pump driven by the engine or it may be collected in a separate string leading to the surface in a manner well known in the art.

It will be seen from the position of the valve that the only chamber filled with power oil at this time is chamber 51a which occurs between lands A and B. Since land B is larger in diameter than land A, pressure in this chamber will tend to hold the valve in its lower position. All of the remaining chambers are vented to discharge. To assure that chamber 56 will be adequately vented, a separate venting means for this chamber is provided which comprises a longitudinal passage 62 in the valve jacket portion 36a which connects to an inwardly directed radial passage 63 which registers with a radial rod passage 64 when the valve is in its lower position. It will be seen that movement of the valve to its lower position has brought land C into a position to cut off the supply passage 55 by which power oil previously entered chamber 56. Thus chamber 56 is at discharge pressure during the upstroke.

The valve is held down by the static pressures in the chambers surrounding it, in this form of the invention, in the same manner as it is held up by static pressures during the down stroke.

The upstroke of the valve will continue until the lateral rod port 42 has pulled up out of the stuffing box 30 and into communication with the high pressure oil in the lower portion of the engine cylinder. Thus the high pressure of the power oil appears in chamber 44 between lands D and E, causing the valve to reverse.

*Top reversal*

Figure 5:
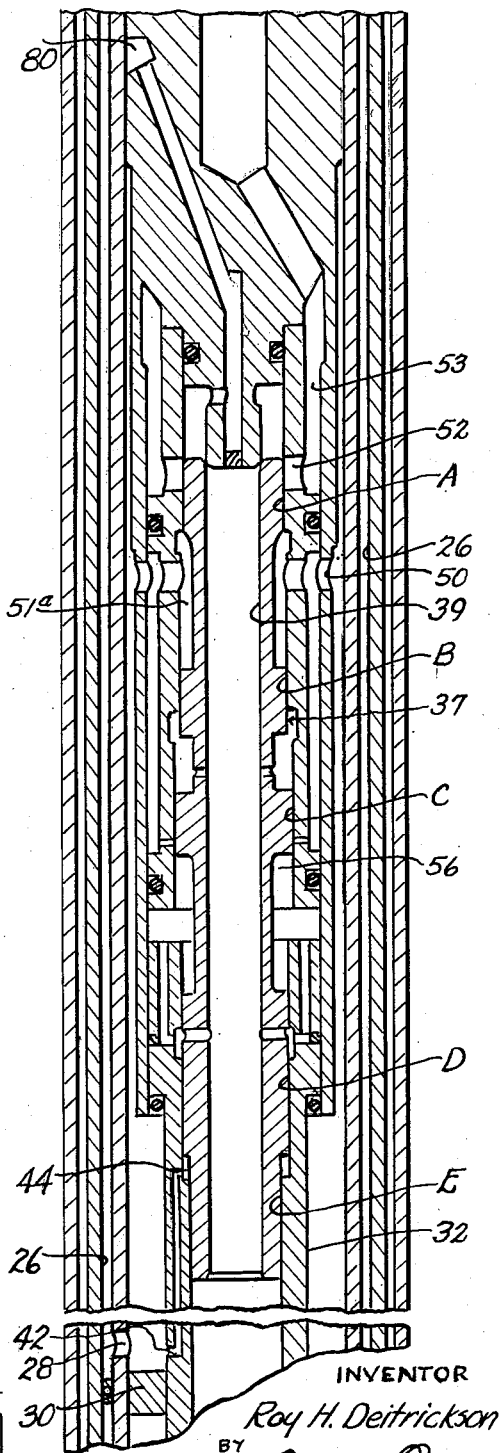
Fig. 5 is a view similar to Fig. 2 with the vale in the position of top reversal.

The top reversal occurs when the rod port 42 pulls above the stuffing box 30 as indicated in Fig. 5. In this figure the valve is shown in its transition between the lower position which it occupies during the upstroke and the upper position which it will occupy during the subsequent down stroke. When high pressure oil appears in the chamber 44 it acts upwardly on the lower surface of land D and downwardly on the upper surface of land E. Since land D is the larger, the force upwardly predominates. The magnitude of the force depends on the difference in area of land D and land E and may be selected to give any desired upward force on the valve. The upward force on the valve must, of course, be greater than the downward force thereon exerted by the high pressure power oil which is still standing in chamber 51a between lands A and B. If the difference between the top and bottom of chamber 51a, however, is only .020 square inch while the difference between the top and bottom of chamber 44 is, for example, .040 square inch, there will be a predominance in the upward force and the valve will reverse. In reversing, the valve first cuts off the communication between port 52 and the discharge and subsequently opens port 52 to the support port 50 which results in the engine piston making a down stroke as above described.

It will thus be seen that there occurs, at each end of the stroke of the piston, a powered reversal of the valve by reason of exposure of the valve to a sudden high pressure either by the registration of the rod port 42 with the high pressure above the stuffing box, or by reason of the registration of the piston port 80 with groove 86 in the wall of the cylinder, this groove being always filled with high pressure power oil. It will also be seen that the valve is essentially balanced except for small static holding forces in each direction.

What I claim is:

1. In a hydraulic engine of the type having a cylinder closed at one end, a piston slidable therein, a piston rod connected to the piston, a stuffing box at the open end of the cylinder surrounding the rod, a source of power oil pressure in constant communication with the cylinder above the stuffing box and below the piston, the opposite side of said stuffing box being in communication with a lower pressure, the improvement comprising a reversing valve including a cylindrical body carried by said engine piston and reciprocable for controlling passages in said piston which passages connect the end of the engine cylinder above said piston to said power oil pressure when said valve body stands in a first position and to said lower pressure when said valve body stands in a second position, means in said engine cylinder near the lower end thereof in communication with said high pressure source, second means in said piston communicating with said valve body so that when said first and second means are brought into registry at the lower end of the stroke of said piston, power oil will be communicated to said valve body causing said valve body to move from said first position to said second position, said piston rod having a passage in communication with said valve body and connected to a second port at the lower end of said piston rod, said second port being normally below said stuffing box in communication with said lower pressure, whereby when said second port passes through said stuffing box during an upstroke of said piston rod into communication with said power oil above said stuffing box, the power oil pressure is transmitted through said rod passage to said valve body causing said valve body to move from said second position to said first position.

2. In a hydraulic engine of the type having a cylinder closed at one end, a piston slidable therein, a piston rod connected to the piston, a stuffing box at the open end of said cylinder surrounding said rod, a source of power oil pressure in constant communication with the cylinder above said stuffing box and below said piston, the opposite side of said stuffing box being in communication with a lower pressure, the improvement comprising a reversing valve including a cylindrical body carried by said engine piston and reciprocable for controlling passages in said piston which passages connect the engine cylinder above said piston to said power oil pressure when said valve body stands in a first position and to said lower pressure below said stuffing box when said valve body stands in a second position, an annular groove in said engine cylinder wall near the lower end thereof in communication with said high pressure source, a port in said piston communicating with said valve body so that when said port registers with said annular groove, power oil from said engine cylinder will be communicated to said valve body causing said valve body to move from said first position to said second position, said piston rod having a passage in communication with said valve body and connected to a port at the lower end of said piston rod, said last port being normally below said stuffing box in communication with said lower pressure, whereby when said last port passes through said stuffing box during an upstroke of said piston rod into communication with said power oil above said stuffing box, the power oil pressure is transmitted through said rod passage to said valve body causing said valve body to move from said second position to said first position.

References Cited in the file of this patent

UNITED STATES PATENTS

| | | |
|---|---|---|
| 1,907,951 | Gage | May 9, 1933 |
| 2,682,257 | Deitrickson | June 29, 1954 |
| 2,851,013 | Doughton | Sept. 9, 1958 |
| 2,870,749 | Deitrickson | Jan. 27, 1959 |